Jan. 25, 1966  Y. F. BERQUIN  3,231,413
METHOD AND APPARATUS FOR GRANULATING MELTED SOLID AND
HARDENABLE FLUID PRODUCTS
Filed Nov. 13, 1962  3 Sheets-Sheet 1

United States Patent Office 3,231,413
Patented Jan. 25, 1966

3,231,413
METHOD AND APPARATUS FOR GRANULATING MELTED SOLID AND HARDENABLE FLUID PRODUCTS
Yves Francois Berquin, Paris, France, assignor to Potasse & Engrais Chimiques, Paris, France, a societe anonyme of France
Filed Nov. 13, 1962, Ser. No. 237,789
Claims priority, application France, Sept. 28, 1960, 839,717; Nov. 4, 1960, 842,983
17 Claims. (Cl. 117—100)

The present invention relates to a method and an apparatus for forming granular products. This invention has particular application to the solution of certain problems relating to the granulation of melted solid and hardenable fluid products which commonly arise in the chemical and fertilizer industries. The present application is a continuation-in-part of an earlier co-pending application, Serial No. 133,179, filed August 22, 1961, now abandoned.

In one principal embodiment (designated the "first process embodiment") the invention is directed to a process for drying and forming granules of fluid products, hardenable by the removal of water therefrom, such as, solutions, pastes, slurries, and the like. In another principal embodiment (designated the "second process embodiment") the invention relates to a process for granulating substances, or mixtures of substances, normally in solid form which melt when heated, i.e., substances existing in a solid stable form at usual storage temperatures (generally corresponding to ambient temperatures). In addition to similarity in certain of the process steps, both of the two principal process embodiments may be practiced with similar granulator apparatus constructed according to the teachings of the present invention.

I. THE FIRST PROCESS EMBODIMENT

There are several techniques known to the prior art wherein drying and granulating operations are combined to obtain the formation of granules from hardenable fluid products. For example, in one known process, a paste is granulated by the method of feeding back or recycling of the fines (the granules or kernels of too small dimension) introduced into a granulator which typically may be in the form of a revolving drum through which a stream of hot air is blown. A paste having any degree of moisture content may be dried by such a process, however, the quantity of fines to be recycled increases with the moisture content of the paste. Furthermore, the size of the granular product obtained varies over an exceedingly wide range.

In another prior art method, the paste is dispersed into a hot stream of gas within a cyclone chamber—a dry powder being directly obtained in such a manner. Such a process, which is often referred to as "atomization," may feasibly be employed when the moisture content of the paste is high (as in the case of slurries) without the need for recycling, but the resulting dried product is in the form of powder or dust rather than granules. Therefore, when it is desired to convert the product from this process into the form of granules, the powder must then undergo several additional treatments; it must either be compressed or, after remoistening, granulated while in the wet state and dried. These additional steps require machinery of expensive and complex design to perform these operations in sequence.

A third known method of obtaining granules of a particular size consists of allowing large droplets of a concentrated, heated solution to fall from the top of a tower. Drops of the solution which have solidified in the course of the fall are then collected at the bottom of the tower. This so-called "prilling" technique is suitable, however, only with pastes having very small moisture contents, as the process consists of a crystallization of the product into spherules rather than a drying into granules. In fact, the time period required for moisture to diffuse through and reach the surface of the spherules would be substantially larger than the entire time during which the spherules remain in the drying equipment; thus the formation of a solid spherule product from such a process can only be explained in terms of a crystallization phenomenon.

The first process embodiment of the present invention described herein sets forth a novel method for obtaining an effective and rapid drying of the paste, or other fluid mixture, into the form of granules without the necessity of recycling the product, regardless of its initial water content. Furthermore, resulting granules are formed which are of substantial size without limitation by the initial moisture content of the input material.

According to the invention, the first process embodiment for drying and granulating a fluid paste, having a liquid or pasty consistency and hardenable by the evaporation of water therefrom, is characterized in that the fluid phase is dispersed or sprayed in an atomized state into a gaseous flow stream. The fluid phase, together with the gaseous flow, are projected in coaxial streams from the bottom to the top through a bed of priming granules within a granulator chamber. These starting granules (sometimes called "cores" or "nuclei") are carried in suspension within the gaseous flow and are continuously circulated about within the granulator chamber in such a manner that there is a progressive deposit on these granules of a film-like layer formed from the atomized fluid phase which has been dried in the gaseous stream during the spraying process. The granular products are thus formed by the build-up of successive layers of the dried, atomized spray on the kernels or cores of starting granules comprising the priming bed with which the granulator is initially supplied.

In this first process embodiment of the invention, the gaseous flow which causes the drying and granulation is comprised of hot gases, and the fluid phase, that is, the concentrated solution, paste, etc., which is to be granulated, either may be relatively cold, i.e., at ambient temperature, or preferably also hot in order to facilitate the evaporation of the water from the granules being formed.

It has previously been proposed to dry and granulate a paste by a spraying of the paste onto a fluidized or flowing granular bed; however, there are two appreciable disadvantages which are intimately associated with such a process. First, it is rather difficult to move, and therefore, to process large granules, so that the size of the resulting product must, of necessity, remain relatively small. Secondly, in such a process, the granules forming the bed are interposed in the path of a stream of heated air which is directly blown onto them completely independent of the spraying of a fluid phase onto the granular bed. For this reason, the temperature of the heated air must be relatively low when heat-sensitive products, such as nitrate fertilizers, are being formed, and the thermal efficiency and output production of apparatus practicing according to this method are therefore quite poor. On the other hand, the process of the present invention, wherein the liquid or paste phase is sprayed within a stream of heated air before there is any contact of the stream with the bed of granules being formed, results not only in a prior drying of the atomized phase, but also produces a considerable fall in the temperature of the air stream before it makes initial contact with the granular bed. This novel process permits the use of heated air having a temperature at the input to the granulator chamber considerably higher than the critical temperature of the granular product (its melting point, for example).

In an important modification of this first process embodiment of the invention, which finds particular application when the fluid mass to be granulated is in the form of a concentrated solution, the liquid phase, which has been previously heated, is sprayed onto the mass of granules being formed from within a strong stream of cold air flowing at a substantially higher velocity than the fluid spray.

In order to introduce the atomized paste spray into the center of the flowing gaseous stream, it is proposed, in preferred embodiments of the invention, to cause the latter to flow in the form of a sheath around the nozzle or jet through which the liquid phase to be dried and granulated is injected, the velocity of the flowing gas being considerably higher than that of the injected liquid phase so as to draw off the atomized particles from the fluid stream. Preferably, both the velocity and the flow rate of the gaseous stream are adjusted so that the granular bed suspended above the fluid injection nozzle is held away by the force of the gaseous stream at a large enough distance such that a pocket is established immediately above the nozzle which is devoid of granules, thereby permitting a partial drying of the atomized fluid mist before its contact with the granular bed.

According to certain advantageous embodiments of the invention, the bed of granules in the process of formation is symmetrically and orthogonally disposed relative to the two coaxial streams of fluid spray and gaseous flow. The kinetic energy of the flowing streams is such that the mass of granules lying in the main path of the streams is lifted well above the uppermost surface of the granule bed and then diverted off to the sides, where it rains down onto the bed below in a virtually continuous manner, thereby causing a constant and regular circulation of all the granules in the entire bed within the flowing streams. When the granules being formed in the bed have reached sufficient size, they may then be drawn off by an overflow means from the upper layer of the granule bed.

In a principal embodiment of a granulator apparatus constructed in accordance with the teachings of this invention, the granulator chamber is in the form of a figure of revolution generally cylindrical and coaxial with the axis of the fluid spray and the gaseous stream which sheathes it. The lower part of the granulator enclosure is in the shape of a truncated inverted cone or frustum which converges toward the outlet of the spray nozzle used for injection of the fluid phase. Such an arrangement permits the granules being formed to be propelled continuously in an ascending direction along the common axis of the granulator chamber and the streams and then to return along the outer walls of the enclosure back towards the injection zone of the atomized fluid spray. The respective paths followed by the various circulating streams of granules lie in substantially "axial" planes; that is, planes which pass through the common axis of the granulator enclosure and the fluid and gaseous streams.

In certain variations of the first process embodiment of the invention, wherein a hot gaseous stream is utilized to dry and granulate the fluid spray, a portion of the exhaust gas at the outlet of the granulator apparatus is reheated and then fed back into the input of the granulator chamber so as to interact again with the fluid mass being injected by the spray nozzle. Thus a portion of the gaseous flow may be made to follow a closed circuit path and thus recycled. With such a recycling arrangement, the amount of calories required for heating of the gaseous flow is materially reduced as the kinetic energy of the flow is more efficiently utilized. It is preferable not to recycle the entire quantity of gas in order to prevent the saturation of the granulator chamber with moisture.

By way of example, it has been found that approximately 65% of the output gas may be advantageously reused in this manner. It is to be noted that if the recovery and maximum utilization of calories is of primary concern, the exhaust gas at the outlet of the granulator chamber may alternatively be supplied to a heat-exchanger which receives and heats the oncoming gaseous flow which is to be blown around the atomizing nozzle. If desired, it is possible to combine both of these last mentioned steps and thereby provide both a preheating of the input gaseous flow by means of a heat exchange with a portion of the exhaust gas which is not recycled, and a subsequent mixing of the preheated input gas together with the remaining fraction of the output which is recycled.

As previously mentioned, instead of using a hot gaseous flow, certain important modifications of this first process embodiment of the invention utilize a cold gaseous flow for drying and granulating the atomized fluid. When a cold gaseous flow is utilized, a smaller amount of caloric energy than that necessary for the process involving a hot air stream is required. In such a case the drying and granulating processes occur as follows: A solution of relatively high concentration, heated to a temperature in excess of its crystallization point, is subjected during atomization to rapid evaporation resulting from intimate contact with the cold air flow, since the water vapor pressure at the external surface of the atomized particles in quite high. Simultaneously, there is a cooling of the particles by the transfer of heat to the gaseous stream. The combined action of these two phenomena (evaporation and cooling) produces a crystallization of the particles in the atomized spray. Nevertheless the temperature of the atomized particles and of the granules being formed therefrom is maintained sufficiently elevated that the vapor pressure at the surfaces of the particles remains high. The water vapor present in the atomized spray is quickly carried away by the surrounding stream of air, which has in the meantime become heated through transfer of caloric energy from the heated solution, and the process goes on until complete dryness is obtained.

Similar to the situation when a hot gaseous stream is utilized, the crystallization process started during the atomizing period in the lower portion of the granulator chamber will continue occurring during each additional deposit of new film-like layers of the product which cover the surface of the granules being formed. The dual phenomena of evaporation-crystallization, combining to produce successive coatings of thin layers on an initial granular core or kernel material, and the resulting physical transformations occur quite rapidly. As a consequence, it is possible to limit both the time duration of the stay of the granules in the granulator chamber and thus the size of the granulator chamber as well.

This modification of the first process embodiment, employing a cold rather than a hot gaseous flow, is particularly useful for the granulation of saline solutions, such as ammonium nitrate, and crystallizable solutions, such as urea. Only solutions having a very high concentration in soluble compound, that is to say containing a very low quantity of solvent, can be treated by cold air according to this process embodiment.

Although it is not true for all products, crystallization of dissolved compounds of the type to which the present process is directed is an exothermic phenomenon. The concentrated solution, upon atomization, is in the form of very fine droplets which come into intimate contact with the cold gas stream. In each droplet the cooling action provided by the gas stream provokes the crystallization of a certain quantity of the dissolved compound, whereby a very low amount of heat is liberated which causes the vaporization of a correspondingly small quantity of water. The evolving of this water increases the crystallization, and so on. While the amount of heat so liberated by the crystallization of the dissolved compound is very low and does not in itself substantially increase the temperature of the cold gas stream, it does however play a significant part in facilitating the drying of each fine particle.

Due to the direct heat exchange between the vaporized solvent and the gas stream, the exhaust gases at the outlet of the granulator chamber are hot; they may be either allowed to escape into the atmosphere or the caloric energy contained therein may be partially recovered by passing them into a heat-exchanger of the gas-liquid type for receiving and preheating the concentrated solution before it is atomized.

II. THE SECOND PROCESS EMBODIMENT

The novel method of the present invention described herein may also be utilized, in a second process embodiment, for the granulation of a wide variety of substances, or mixtures of substances, which are normally in solid form at ambient temperatures but which can be melted without any deterioration or alteration of properties. Preferably the melting point of solid substances selected to be granulated should be of sufficiently low temperature that is possible to practice the process of the present invention in a granulator apparatus constructed of common industrial materials.

Exemplary of the materials having low melting temperatures which may be readily granulated according to this second process embodiment of this invention include; metals such as lead (327° C.) and bismuth (271° C.); metal alloys having low eutectic melting points such as lead-antimony (228° C.), lead-tin (182° C), bismuth-tin-lead (60° C.), and cadmium-bismuth-tin-lead (100° C.); metalloids such as sulphur; and organic substances such as napthalene.

According to the invention, the second process embodiment comprises melting the solid substance and then atomizing or spraying the liquid phase thus obtained into a gaseous flow stream having a temperature below that of the melting point of the substance to be granulated. In a manner similar to that of the first process embodiment, the gaseous flow stream, as well as the liquid phase of the substance dispersed within, are then jointly projected upwardly through a bed of priming granules which are contained within a granulator chamber and maintained in suspension therein by the force of the gaseous flow.

In the flow interaction between the fluidized heated substance and the gaseous stream of lower temperature, which occurs prior to their coming into contact with the bed of priming granules, the droplets of liquid phase are cooled down very close to the solidifying temperature. The operating conditions are so adjusted in practice that actual solidification does not take place until the droplets come into contact with the granule bed. Accordingly, the liquid droplets, now partially cooled, are deposited on individual granules in the form of a coating which rapidly soldifies, due to further cooling provided by the gaseous stream, thus increasing the size of the granule.

In evaluating the importance to the art of the contribution provided by the present invention it should be borne in mind that, prior to the present invention, it was not believed possible to crystallize substances having a melting (or soldifying) temperature precisely determined. In fact, the teachings of the prior art would lead one to expect that, in utilizing the method and apparatus of the present invention, an untimely crystallization of the liquid phase of the melted substance would occur before it reached the bed of priming crystals, thus preventing the progressive build-up of the granules by solidfying coating deposits. On the basis of experience with prior art processes, it could also be feared that the caloric heat energy contained in the proecjted liquid droplets, upon striking the bed of priming granules, might cause the granules to soften and stick together, and eventually cause the blocking of the apparatus.

However, in practice, by adjusting different parameters (i.e., the liquid and gas flow inputs, the temperature of the liquid at the point of its injection into the gaseous flow stream), it has been found that granulation of the melted substance can be readily and advantageously effected by the process described with a continuously progressive growth of the granules suspended in the gaseous stream until they can reach suitable size. The solid granules obtained from this process embodiment are of similar granularity and possess a very regular spherical shape.

This process embodiment of the present invention for granulating melted solid substances is similar in many respects to the first process embodiment, previously described, for drying and granulating hardenable fluid products. In particular, it is possible to use a granulator apparatus of essentially the same design for both processes, and the conditions for injecting the liquid phase of the substance which is to be granulated and the gaseous flow stream are very much like those of their counterparts in the first process embodiment.

The foregoing and other objects of the invention will be more fully understood by a consideration of the following description, taken in conjunction with the accompanying drawings, in which.

Figure 1:
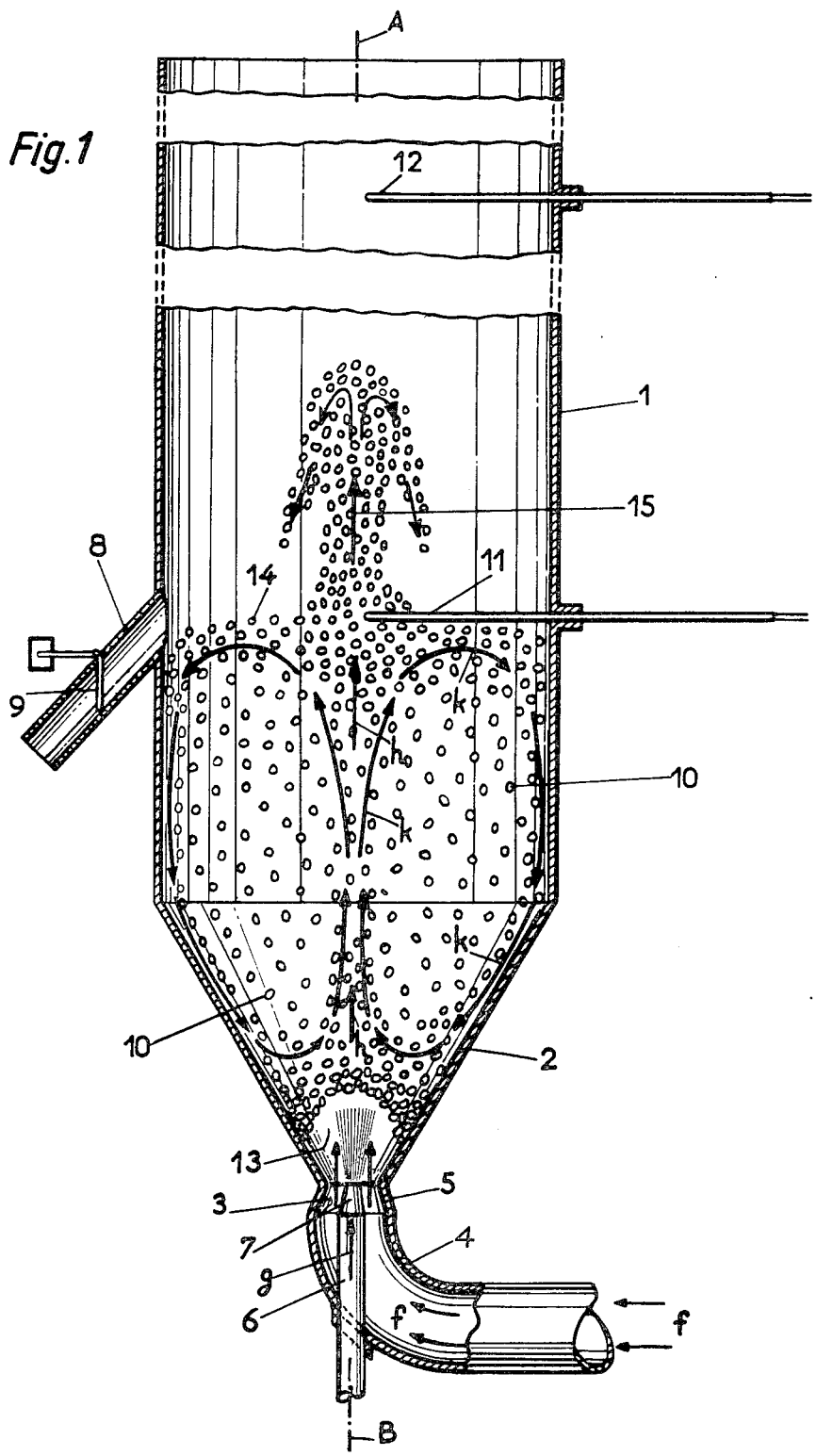
FIG. 1 is a side elevation view, partially diagrammatic and partially sectional, showing an illustrative embodiment of a granulator apparatus suitable for practicing the method of the present invention.

Referring now to FIG. 1, a granulator apparatus suitable for practicing the method according to the present invention illustratively comprises a cylinder of revolution 1 of substantial height, for example, between five and ten meters, disposed along a vertical axis A–B. The lower part of the cylinder 1 is integral with a hopper 2 of generally frusto-conical design with a relatively steep slope. These two elements together comprise the chamber enclosure for the granules during formation.

The lower opening 3 of the hopper 2 is connected to an elbow-bend conduit pipe 4 which brings to this opening a hot or cold gaseous flow-stream, diagrammatically shown by the arrows at $f$. In the preferred embodiment shown herein, the pipe 4 terminates in a region 5 of restricted cross-sectional area immediately before its junction with the opening 3 in the bottom of the hopper 2. These two juxtaposed sections together constitute a converging-diverging flow system which submits the instreaming gaseous flow to a substantial acceleration.

A supply tube 6 for the fluid phase which is to be granulated is adapted to lie along the vertical axis A–B of the granulator apparatus and extends into the center of the pipe 4. This supply tube 6 terminates in an injection nozzle 7 located approximately at the same level as the opening 3 in the base of the hopper 2. The product which is to be granulated is fed into the granulator chamber by this supply tube, the fluid flow being diagrammatically shown by the arrow at $g$.

The granulator equipment contains an overflow weir 8 having a pivoted door or gate valve 9 for allowing solid products to pass therethrough but retaining the gases within the granulator chamber when closed. Radial thermocouple probes 11, 12 are mounted at various levels in the chamber wall for monitoring the temperature at selected points within the cylindrical enclosure 1.

In the practice of the method, either hot or cold gases are directed by means of a blower (not shown) into the granulator chamber through the input pipe 4, and the fluid phase of the material which is to be granulated is forced by means of a pump (not shown) through the supply tube 6 and into the granulator chamber at the opening 3 at high velocity, e.g., between thirty and fifty meters per second. On the other hand, the velocity of the fluid phase supplied by the tube 6 may be much less, by a factor of ten to one hundred times smaller, for example.

In the practice of the first process embodiment of the invention, which is utilizable with material in an aqueous fluid phase such as slurries, pastes, and the like, the operation is initiated by depositing a supply of priming granules, whose sizes are slightly less than that desired for the final product, into the granulator enclosure, and then forcing hot gas, exemplarily at a temperature of several hundred degrees centigrade, through the input pipe 4, thereby causing the priming granules to pass into the state of a flowing (or fluidized) bed. After such a result has been obtained, the fluid phase which is to be dried and granulated is fed into the granulator chamber by the supply tube 6. At this point the following events occur; due to the turbulence of the onrushing gaseous flow at the lower part of the hopper 2, the granules from the bed which are suspended therein are held away at some distance, such that a pocket 13, devoid of granules, is formed downstream relative to the opening 3. The fluid phase supplied by the tube 6 is injected in the form of a jet stream into the midst of this pocket 13 by the spray nozzle 7 where it is immediately broken up into small droplets by the frictional action of the gaseous flow. Simultaneously, the divergent opening 3 arranged at the bottom of the hopper 2 causes a relative vacuum to be generated which further facilitates the dispersion of the fluid phase into droplets and the removal therefrom of included water. The heated gaseous medium produces a partial yet substantial drying of the droplets or mist formed by the atomization of the liquid phase, while at the same time a considerable drop in the temperature of the gas results.

As the stream of onrushing gas spreads out, with a consequent diminution of its velocity, the gas stream comes into contact with those granules 10 of the fluidized bed which are in the vicinity of the opening 3 and it passes through the midst of these granules, flowing substantially along the vertical axis A–B of the granulator chamber. At the same time, the dampened and partially dehydrated fines (small particles), supplied by the jet stream of the atomized liquid phase after its passage through the pocket 13, are applied by the flowing action of the gaseous stream in the form of a film coating on the impinged-upon granules, which are thus enriched by the solid products.

Because of the high kinetic energy possessed by the gaseous flow, those granules 10 which are within the gaseous stream are subjected to an upward movement along the vertical axis A–B of the apparatus, as depicted by the arrows $h$, and a sort of geyser or fountain 15 of granules is formed above the granular bed which falls back like rain onto the upper surface 14 of the bed. This ascent of the granules 10 while within the hot gaseous stream provides an additional drying of the thin coatings of paste deposited on the surfaces of the granules during their encounter with the atomized fluid spray.

It has been observed in operation according to this method that the mass of granules 10 contained within the granulator enclosure circulate about in closed paths lying in axial planes, such path streams being diagrammatically shown by the arrows $k$. In the process of circulation, the granules in a given stream proceed upward and outward until the periphery of the cylindrical chamber is reached by the radial divergent action of the flowing gaseous stream, and thereafter fall slowly down along the walls of the chamber returning towards the pocket 13. Upon reaching the fringes of the pocket 13, the granules are thence recovered by the upward onrushing gaseous stream, as at $h$, and the cycle begins again.

As the granules located in the vicinity of the axis A–B, where the fines from the atomization process are projected, are subjected to an ascending movement, while the granular bed located in the remainder of the chamber is subjected to a slow descending movement, the granules immediately facing the jet stream above the nozzle 7 are therefore continuously renewed.

As a progressive growth of the granules occurs during each circulation cycle due to the deposit thereon of a thin drying film of atomized product, after some time has elapsed the granules reach a sufficient size where they then may be removed from the granulator chamber by means of the overflow weir 8.

It has been experienced in operation of this apparatus that, unexpectedly, during the circulatory movement of the granules, a relative classification of the granules according to size occurs. In actual practice, the granules of large and homogeneous size are generally found in the upper portion of the granular bed near its periphery, and it has been possible, therefore, by means of an overflow weir such as 8, to remove corresponding granules of similar granularity. Furthermore, the experience has been that, when the apparatus is operated continuously for some time without immediate removal of granules, the whole mass of the granules produced tend to possess a homogeneous granularity throughout without the presence of granular particles having excessive sizes. Control of the rate of growth of the granules may be accomplished by adjusting the rate at which the atomized fluid or paste spray is supplied; a high rate results in the production of somewhat larger granules (since in each cycle the layer of solid product deposited is more substantial), and conversely. By adjusting the temperature of the input gas, when a hot gaseous flow is being used, in such a manner that the granules will be fully dried in any event, it is possible to regulate the equipment such that the quantity of granules being formed within the granulator chamber remains substantially constant. This regulation results in a continuous processing operation yielding a homogeneous production of granules.

Similar results may be obtained in a modification of this first process embodiment when a cold gaseous flow is supplied to the input of the granulator chamber, instead of a stream of heated air, the differences in the technical result obtained being those previously stated; namely, the elevation in the temperature of the exhaust gases at the outlet of the granulator chamber by reason of the caloric heat exchange produced during the drying of the preheated atomized spray.

In the practice of the second process embodiment of the method of the present invention, utilizable with solid substances and mixtures having relatively low melting points such as the materials previously described, the operation is initiated by converting the solid material into the liquid phase by heating. The melted substance is then introduced into the granulator apparatus of FIG. 1 by forcing the liquid under pressure through the supply tube 6 and out of the injection nozzle 7 disposed at the bottom opening 3 of the granulator.

The liquid is dispersed into droplets by the injection nozzle and projected along the vertical axis of the granulator enclosure upwardly within the surrounding sheath of gas supplied through the input pipe 4. The temperature of the gaseous flow at the point of its introduction into the granulator chamber is lower than the melting temperature of the material selected to be granulated. In a treatment region provided by the pocket 13, which is formed above the base of the granulator chamber by the force of the injected gaseous flow, the dispersed droplets of liquid phase are cooled down very close to the solidifying temperature through interaction with the gaseous flow stream.

The coaxial liquid and gaseous streams, after passing through the pocket 13 which is devoid of granules, ascend along the vertical axis A–B, as depicted by the arrows *h*, and through the fluidized bed of priming granules which are maintained in suspension by the gaseous flow stream and circulate in geyser fashion along closed axial paths. When the partially-cooled droplets come into contact with the circulating streams of granules in formation, a coating is formed on the individual granules which solidifies as further cooling by heat transfer to the gaseous stream takes place. Any latent heat evolved as solidification of the liquid droplets occurs (such as is the case generally when the phenomenon is one of crystallization) is removed by the gaseous flow which is exhausted out of the top of the granulator chamber. The size of the granules in the fluidized bed are thus increased through the progressive build-up of enriching deposits, solidified on the granules by the cooling action provided by the gaseous stream.

Accordingly, the process embodiment described herein, although generally similar to the first process embodiment described previously, differs therefrom in one major respect. In the first process, the material which is to be granulated is in the form of an aqueous fluid phase and, during the process of granulation, the water content is evaporated. Therefore, granulation in the first case is dependent not only on the temperature but also on the initial water content of the sprayed paste or slurry material. This water content decreases, due to the drying action provided by the gaseous stream, from the moment the liquid is projected into the granulator chamber until the partially-dried, thickened paste is deposited on the granular cores comprising the primary bed. On the other hand, in practicing the present process embodiment, the granulation is dependent only upon the temperature of the droplets of the melted solid material which is to be granulated. Hence, by proper adjustment of the temperature of the injected liquid phase, as well as the respective flow rates of the liquid and gaseous inputs, it is possible to obtain a rapid and satisfactory growth of granules to substantial size.

Whenever the solid product to be granulated by this second process embodiment *is not* susceptible to deterioration by air (for example, sulphur), the gaseous flow stream, injected into the granulator chamber by the input pipe 4, may be comprised of air at ambient temperature. On the other hand, when the liquid *is* susceptible to deterioration in the presence of air (for example, lead), the injected gaseous flow stream is preferably chosen to be an inert gas, such as nitrogen, flowing in a closed circuit. In the latter case a heat exchanger of conventional design or other suitable heat-removal means is placed in the circuit flow path to cool the gas before recycling it to the base of the granulator chamber.

In one important modification of this second process embodiment of the present invention, suitable for use when the melted solid product to be granulated is not hygroscopic, water is sprayed into the gaseous flow stream. One manner in which this may be advantageously accomplished is to inject the water into the gaseous stream by means of a plurality of thin, radially-directed water jets located in the narrow neck portion 5 of the converging-diverging system formed by the junction between the gas conduit pipe 4 and the bottom opening 3 in the base of the granulator chamber. The water mist produced reduces the resultant temperature rise of the gaseous stream as it proceeds to cool down and eventually solidify the injected liquid droplets, thereby permitting the input rate requirement for the gas flow to be decreased or, for the same input rate, the production of granules to be increased.

When the gaseous flow stream containing dispersed water spray impinges upon the flowing bed of granules, the water is immediately transformed into steam, by reason of the heat produced in the solidification process. The vaporization of the water thus serves to maintain the temperature of the gaseous flow stream at about 100° C. As the water vaporization temperature is assumed to be lower than the solidifying temperature of the material being granulated, a second heat exchange takes place between the liquid droplets of the melted material and the surrounding gaseous flow stream, thus facilitating the solidification of the liquid coating deposited on the granules in the priming bed. Since the gaseous flow stream is maintained at a lower temperature in this modification of the second process embodiment than that which would otherwise result in the absence of water spraying, it will be readily understood that, all other conditions remaining the same, the input rate for the stream of cooling gas will be reduced or, for a given input rate, the quantity of granules produced in a given time period will be increased.

Figure 2:
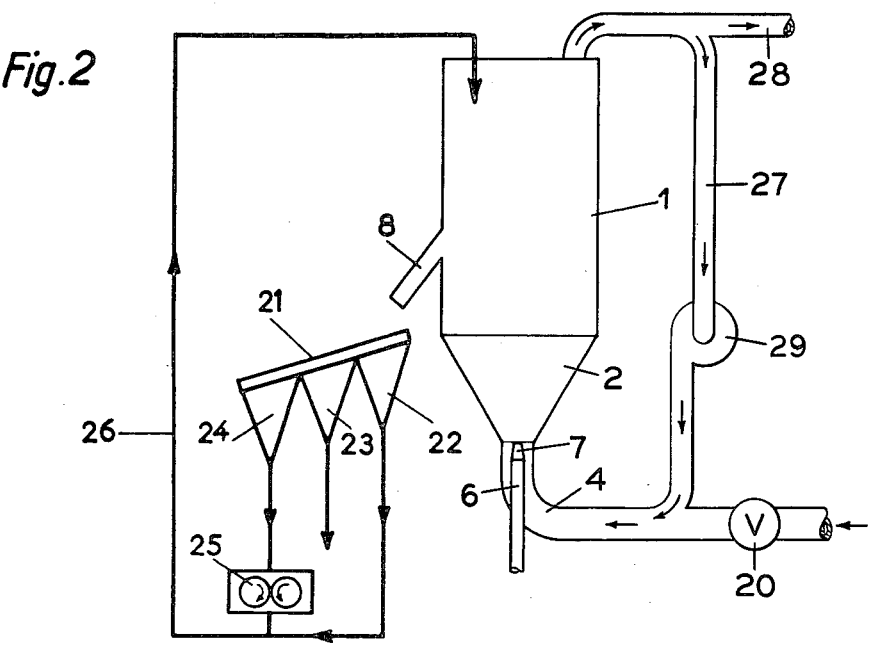
FIG. 2 shows a schematic diagram of the granulator apparatus of FIG. 1 included in a fertilizer granulating process wherein a portion of the outlet gases are recycled.

In operation, the granulating apparatus of the present invention is incorporated into a complete processing system, the structure of which is adapted to the particular characteristics of the product which is to be granulated. FIG. 2 shows the granulator embodiment of FIG. 1, wherein identical reference numerals are utilized to identify corresponding elements thereof, in a fertilizer granulating process.

Thus, when the fluid product exemplarily is in the form of a fertilizer paste, a set of screens 21 of increasingly larger mesh, below which are disposed in successive alignment three hoppers 22, 23 and 24, are arranged to receive the output from the granulator chamber 1 via the overflow weir 8 and to segregate by size the fines, the marketable granules, and the grosser granules, respectively. The last-mentioned group of granules are fed by the hopper 24 into a grinding unit 25 which reduces them to smaller size, and they are then mixed together with the group of fines obtained from the hopper 22 and re-fed into the granulator via pipe 26 to form the priming or core material for future granules. As stated previously, the amount of fines and grosser granules produced by the granulator apparatus is relatively low compared to the large quantity of granules produced of marketable size, therefore the screening and grinding units may be correspondingly reduced in size from those required in conventional granulating processes known to the prior art. A substantial fraction of the exhaust gases appearing at the outlet of the granulator chamber 1 is captured and then directed by a suitable means, such as a blower 29, through line 27 into the input gaseous stream being supplied by the conduit pipe 4. The remaining fraction of the exit gases is discharged into the atmosphere by line 28 in order to remove moisture-saturated steam from the granulator and to permit the entry of a fresh supply of heated gases. If desired, the recycled portion of the output gaseous flow supplied by the line 27 may be reheated prior to its introduction into the input gaseous stream by means of an auxiliary heating unit (not shown). Valve 20 provides a means for suitably regulating the rate of flow and the velocity of the gaseous stream in a conventional manner.

Figure 3:
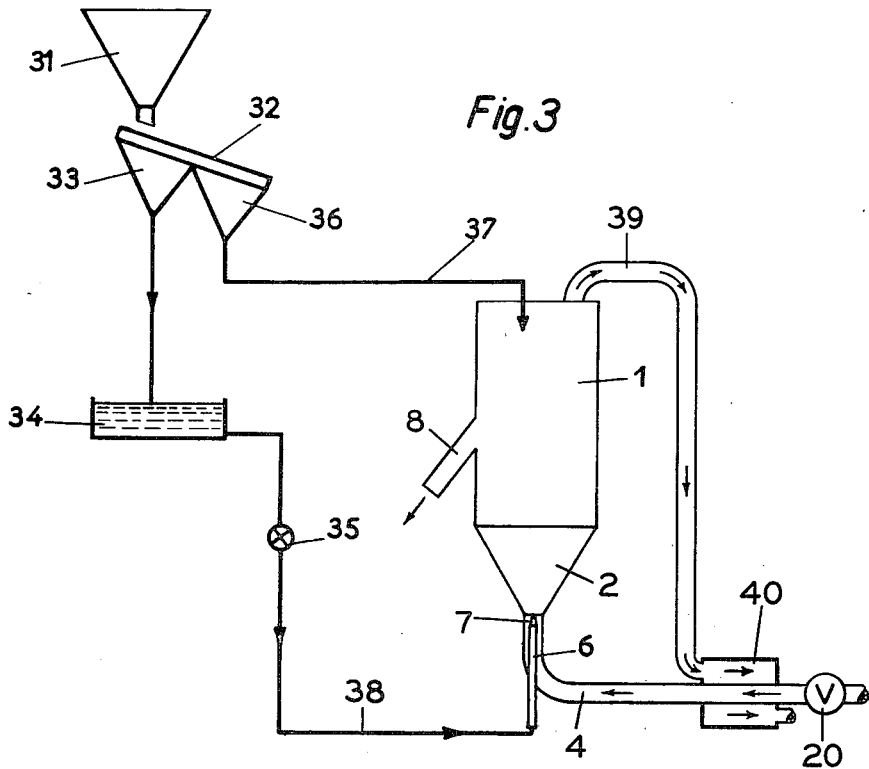
FIG. 3 shows the granulator apparatus of FIG. 1 included in another illustrative type of granulating process wherein the exhaust gases are utilized to preheat the input gaseous stream by means of a heat-exchanger.

The production of granules, when the primary or core material is already in the form of crystallized salts, may be achieved with equipment such as that illustratively shown in FIG. 3. The salt which is to be granulated is fed from a hopper 31 into a screening unit 32 followed by two hoppers 33 and 36. The fines are segregated and supplied to the hopper 33 where they are dissolved (or suspended) within a water tank 34 from which the solution (or suspension) is then directed over conduit 38 by means of a pump 35 to the injection nozzle 6 of the granulator. The larger crystal particles (for example, those ranging from 1 to 2 mm. in size), which, however, are smaller than the granules desired to be produced, are received in the hopper 36 from which they are carried by conduit 37 and fed into the granulator chamber 1 to form the starting bed of granules. The marketable granular product is removed from the granulator chamber via the weir 8 during operation of the process.

In the application shown, the exhaust gases appearing at the outlet of the granulator are captured and channeled via line 39 into a heat exchanger 40 which transfers latent caloric energy contained in these exhaust gases to the input gaseous stream carried by the conduit pipe 4, thus preheating same. The gaseous flow passing through the pipe 4 may, after passing through the heat exchanger, be additionally heated by an external heater (not shown), at a point downstream of the location of the heat exchanger.

Figure 4:
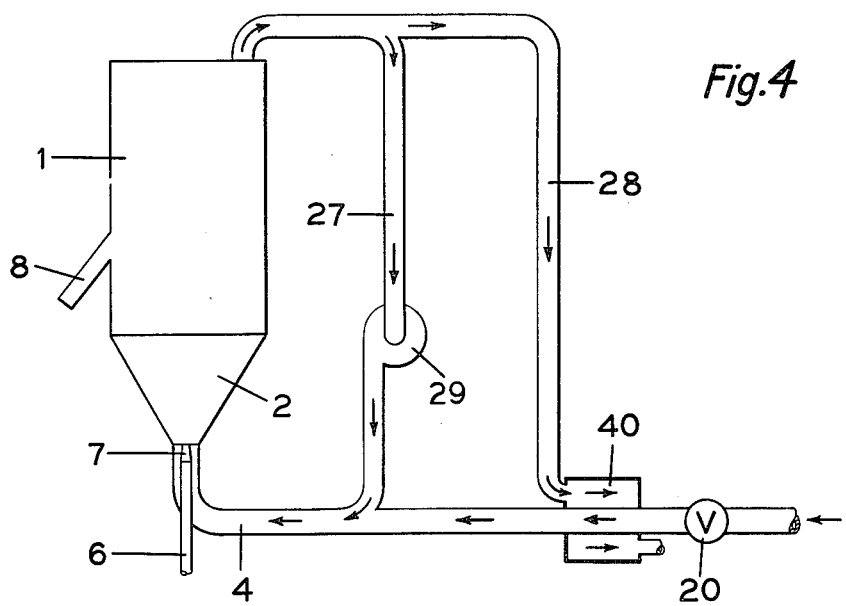
FIG. 4 is a schematic diagram of the granulator apparatus of FIG. 1 wherein a portion of the exhaust gases are recycled and the remaining portion of the exhaust gases are utilized to preheat the input gaseous stream by means of a heat-exchanger.

Referring again to FIG. 2, which illustrates recycling of exhaust gases, it will be understood in the light of the foregoing discussion that the portion of the exhaust gases which pass through the pipe 28 may be heat exchanged with the input gas, thereby combining the recycling feature with the heat-exchanging feature. Thus there is provided a preheating of the input gas by the part of the output gas which has not been recycled, and thereafter a mixing of the preheated input gas together with the recycled fraction of the output gas. In such an arrangement, the two pipes at the right hand side of FIG. 2 would pass through a heat exchanger, and additional heat may be thereafter supplied to the input gases in the pipe 4 by a heater. Such an arrangement is exemplified in the embodiment shown in the schematic diagram of FIG. 4.

Figure 5:
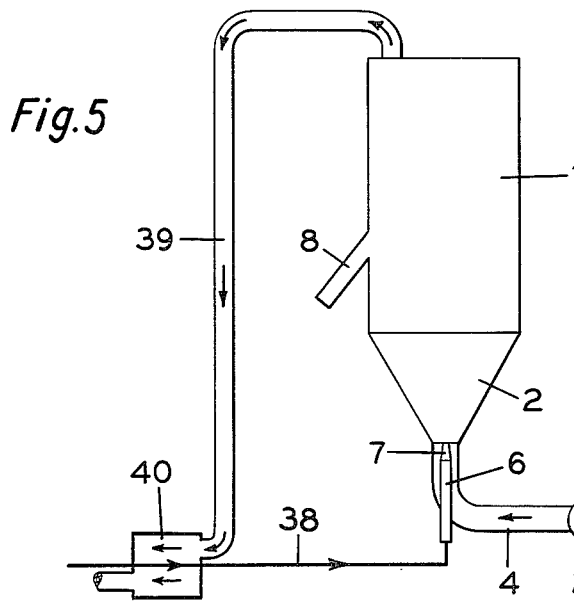
FIG. 5 is a schematic diagram of the granulator apparatus of FIG. 1 wherein the exhaust gases are utilized to preheat the fluid to be atomized by means of a heat-exchanger.

In certain modifications of the first process embodiment wherein a cold gaseous flow is utilized to perform the drying and granulating operations on hardenable fluid products, instead of heat exchanging the exhaust gases with the instreaming gases carried by the pipe 4, the exhaust gases, heated during the exothermic reaction in the granulator, may be directed into a heat exchanger unit juxtaposed next to the supply conduit 38, where they may be employed to preheat a concentrated solution fed into the injection nozzle 6 by transfer of caloric energy as the solution is carried along. This arrangement is illustrated in the schematic diagram of FIG. 5.

Other modifications of, and variations on, the processes and apparatus described herein which are embodied within the scope of the present invention will readily occur to those skilled in the art when applying these teachings to the particular industrial applications at hand. For example, the situation may arise wherein it is desired to treat an important output of the fluid phase which is to be granulated, and accordingly, auxiliary means may preferably be provided in the granulator apparatus to insure that a fine dispersion of the fluid flow and its resulting transformation into fine droplets occur during the atomization process. In particular, the dispersion of the fluid phase into droplets may be facilitated by means of a secondary stream of flowing gas having a direction different from that of the main gaseous flow. It may also be expedient to use suitable mechanical means, e.g., turbine, rotating basin, etc., to break off the stream of injected fluid before its contact with the gaseous flow thereby to cause a better dispersion of the fluid phase into fine droplets.

Among the significant advantages of the method practiced according to the principles of this invention (in addition to those heretofore recited), particular attention is called to the following:

The granules obtained from this method are of very regular spherical shape. As these final granular products result from a progressive growth in the form of layers, any accidental irregularity of growth occurring in a particular cycle is therefore damped out during succeeding cycles. Accordingly, the screening and grinding operations commonly used with conventional granulation processes may be reduced to a minimum, if not eliminated entirely, the cost of equipment required at the manufacturing plant for performing these operations thereby being substantially decreased.

A granulator apparatus performing the process of the present invention is inherently of high thermal efficiency. Furthermore, in the drying and granulation of hardenable fluid products according to the first process embodiment of the invention, very hot gases may be supplied to the input of the granulator without deleterious effect on the atomized state of the paste spray, thus permitting a virtually instantaneous evaporation of the included water from the paste with an immediate lowering of the temperature of the gases. Much of the remaining heat of the gases is then transferred to the granules as the gases pass through the flowing (fluidized) bed, such that the exhaust gases at the output of the granulator are dropped to a very low temperature. It is practical, for instance, to supply gases heated as high as 200° C. for the drying of a granular product having a critical temperature of 120° C., the temperature of the output gases dropping as low as 65° C.

Complete drying of the granules in such cases is obtained very rapidly, since the drying is carried out while the product is either in the atomized state or in the form of a thin, film-like layer on the granule surface. As a consequence, the size and complexity of the granulating apparatus may be quite reduced.

Due to this characteristic high drying power, apparatus according to this invention is especially suitable for the granulation of fertilizers, while eliminating in part, if not in full, the necessity for a recycling of the granular product, thus resulting in a substantial economy and improvement of the fertilizer production rate.

Although the novel features which are believed to be characteristic of the invention will be pointed out in the annexed claims, the invention itself, as to its objects and advantages and the manner in which it may be carried out, may be better understood by reference to the following examples taken in conjunction with the foregoing description.

*Example 1.—Manufacture of a granulated nitro-phosphoric complex fertilizer produced from a paste containing 27% water, 16.6% nitrogen, and 16.6% phosphoric anhydride*

For starting of the granules, a granulator apparatus constructed in accordance with the teachings of the present invention was primed with a preliminary charge of fertilizer core material obtained from a former production. Hot air at a temperature of 170° C. was fed into the bottom of the granulator at a flow rate of 50,000 cubic meters per hour. The paste to be granulated was supplied to the spray nozzle at a rate of 5.50 metric tons per hour. As granules of the desired size were formed, the fertilizer was drawn off continually in order to insure that the thickness of the bed be kept constant. The temperature of the gases at the exhaust of the granulator was 70° C.

Four metric tons per hour were produced in this manner, having as Formula 22–22–0 (a trade expression common to the fertilizer industry meaning the product is comprised of 22% nitrogen, N; and 22% phosphoric acid, $P_2O_5$). 90% of this resulting product was constituted of granule sizes ranging between 3 and 3.5 mm. in diameter and containing 2.4% moisture.

*Example 2.—Production of granular potassium chloride from the crystalline state*

Crystals of potassium chloride were first sieved, so as to separate out a metric ton of crystals having a granularity between 1 and 2 mm., and then deposited in the granulator to form a bed of starting cores or nuclei.

The remainder of the crystals sorted from the preceding sieving process, that is, the fines and the gross crystals, were used to prepare a concentrated solution containing 32% potassium chloride by weight and having a specific density of 1.2. This solution was injected by the nozzle at the base of the granulator at a rate of two cubic meters per hour (approximately 2.4 metric tons per hour), and simultaneously a stream of hot air at 200° C. was introduced into the granulator at a flow of 50,000 cubic meters per hour. The temperature of the air escaping at the outlet of the granulator was on the order of 60–65° C.

During the operation, the initial priming crystals became progressively larger and more symmetrical. After a period of about four hours, granules of 4 mm. size were obtained, and removal of the granules was then commenced so as to maintain the level of the bed constant. At the outlet of the granulator, the drawn-off granules were sieved so as to separate out the desired marketable product consisting of granules having a diameter between 4 and 5 mm. The granules of too fine sizes were redeposited in the bed of the granulator together with the potassium chloride crystals of 1 to 2 mm. width obtained from the original sieving process, the whole mixture constituting starting nuclei for future granules. Granules of too large size, which did not constitute more than 5% of the output of the granulator, were separated out, coarsely ground and re-sieved. Thus the too fine and too large granules, which were undesired products as they are not marketable, were recycled through the granulator in the same manner as the initial crystals of potassium chloride.

After stabilization was achieved in the size of the granules produced, the apparatus continuously supplied one metric ton per hour of spherical granules lying within the desired range of marketable sizes.

*Example 3.—Production of ammonium nitrate granules*

A 96% solution of amonium nitrate was first pre-heated to a temperature of 175° C. and then injected via the spray nozzle at a rate of 7,050 liters per hour into a granulator capable of a 10 metric ton per hour production. Simultaneously with the injection of the concentrated solution, a stream of cold air at a rate of 50,000 cubic meters per hour was supplied to the apparatus. The initial priming charge for the granular bed was comprised of 1.5 metric tons of granules of various sizes obtained from a previous operation. The exhaust gases at the outlet were at a temperature of 55° C. and the resulting granules produced at 60° C. In an hour, a production of 9.550 kilograms of ammonium nitrate was obtained containing 0.2% moisture and comprised substantially of spherical granules having sizes ranging between 2.5 and 4 mm.

*Example 4.—Granulation of sulphur*

One hundred kilograms of refined sulphur were melted at 135° C., and the melted sulphur then introduced into a granulator apparatus, similar in construction to the embodiment shown in FIG. 1, by forcing the liquid under pressure into the injection nozzle of the spray tube disposed along the vertical axis of the granulator. The injection of the fluid phase of the sulphur was effected at a 40 kilogram per hour input and, simultaneously, an air flow stream of 40 cubic meters per hour at ambient temperature was injected via the gas input pipe. Prior to the injection of the melted sulphur the granulator apparatus had been loaded with an intial charge of 8 kilograms of sulphur granules obtained from a previous operation and the granules fluidized to form a flowing bed of priming granules. A production of 97 kilograms of sulphur was obtained in this operation, with the resulting product being in the form of regular spherical granules of sizes ranging between 2 and 5 mm. in diameter.

In performing a variation of this process embodiment for manufacturing sulphur granules, wherein a spray of water was added by injection into the air flow stream at the rate of 1 liter per hour, it was found that the quantity of injected air could then be reduced to about 25 cubic meters per hour while still obtaining the same output production of sulphur granules as before.

Whereas the terms and expressions which have been employed are used as terms of description and not of limitation, and whereas there is no intention, in the use of such terms and expressions, of excluding any equivalents of the features shown and described, or portions thereof, it being recognized that various modifications are possible within the scope of the teachings of the invention, it is hereby stated and desired that the scope of the invention be limited solely by the following appended claims.

As used in the annexed claims, the terms "liquefiable material" and "liquefied material" shall mean fluid materials which are hardenable by the removal of water or other volatile liquid therefrom (such as solutions, pastes, slurries, and the like), as well as substances, or mixtures of substances, which are normally in solid form but which are meltable by heating.

What is claimed is:

1. A process for granulating a liquefiable material into particle sizes on the order of two millimeters in diameter or greater, comprising the steps of: atomizing and projecting said material in a liquefied phase within a sheathing stream of gas phase, first upwardly through an interaction region substantially free of subsequently produced granules, wherein said atomized liquefied material is partially treated by said stream of gas through the exchange of caloric energy therebetween, and then upwardly through a bed of priming granules of core material, said bed being constrained within a container of substantial height and having a downwardly converging lower portion of generally frusto-conical form whose lowermost base diameter is substantially equal to that of said interaction region; and regulating the velocity and flow rate of said stream of gas in a manner both as to support said bed of granules suspended substantially entirely above said interaction region solely by the kinetic and pressure heads of said liquefied phase-gas phase stream and to entrain and carry the lowermost granules upwardly within said stream, thereby causing a continuous circulation of said granules above said interaction region with a progressive deposit on said granules of partially-treated atomized liquefied material and a further treatment by said gaseous stream through the medium of caloric energy exchange to produce solidification of said material on said granules.

2. The process of claim 1 further including the step of removing the finished granules by overflow from the top of said bed.

3. The process of claim 1 characterized in that said liquefiable material to be granulated is normally in solid form but melts when heated, that said material is first melted into a liquid phase and thereafter is atomized and projected within said sheathing stream of gas phase which has a temperature lower than the melting point of said material, that said liquefied material is cooled down close to its melting point by said gas stream while passing through said interaction region, and that the partially-cooled liquefied material is next deposited on said granules in said circulating bed where further cooling by said gaseous stream then occurs to produce solidification of said material on said granules.

4. The process of claim 1 characterized in that said liquefiable material to be granulated is hardenable by the removal of water therefrom, that said material in a liquefied phase is first partially dried of water content in said interaction region by the exchange of caloric energy with said gaseous stream, and that the partially-dried liquefied material is next deposited on said granules in said circulating bed where a further drying by said gaseous stream then occurs to produce solidification of said material on said granules.

5. The process of claim 4 further characterized in that said liquefiable material to be granulated is first preheated and thereafter is atomized and projected in a liquefied phase within said sheathing stream of gas phase which is at a higher temperature than said liquefied material.

6. The process of claim 4 wherein said liquefiable material to be granulated consists essentially of solvent and solid material in solution.

7. The process of claim 4 further characterized in that said liquefiable material to be granulated is a highly concentrated crystallizable solution, that said material is first preheated and thereafter is atomized and projected in a liquefied phase within said sheathing stream of gas phase which is comprised of initially cold air, and that, as a result of caloric energy exchange therebetween, said liquefied material becomes dried by the removal of water content therefrom and said gaseous stream becomes heated.

8. A process for granulating materials, normally in solid form but which melt when heated, into particle sizes on the order of two millimeters in diameter or greater, comprising the steps of melting into a liquid phase the material to be granulated, spraying the liquefied material into a gaseous flow stream having a temperature lower than the melting point of said material, projecting said liquefied material jointly with said gaseous flow stream first upwardly through a cooling region, wherein said liquefied material is cooled down close to its melting point by said gaseous stream, and then upwardly from bottom to top through a bed of priming granules of core material, so as to cause said stream of gas to maintain said granules suspended and to carry them upwardly within said stream, thereby causing a continuous circulation of said granules and a progressive deposit on said granules of partially-cooled liquefied material and a further cooling by said gaseous stream to produce solidification of said material on said granules.

9. A process according to claim 8, utilizable when said material to be granulated does not deteriorate in the presence of air, characterized in that said gaseous flow stream comprises air at ambient temperature.

10. A process according to claim 8, utilizable when said material to be granulated can be deteriorated by the presence of air, characterized in that said gaseous flow stream comprises an inert gas flowing in a closed circuit.

11. A process according to claim 8, utilizable when the material to be granulated is not hygroscopic, including the step of projecting water spray together with said gaseous flow stream, whereby the water mist so produced serves to reduce the temperature of the gaseous flow stream surrounding said liquefied material, thus permitting a decrease in the input flow of said stream required for a given production of granules from said material, or correspondingly, for a given input flow, an increase in the production of granules.

12. A process according to claim 8 characterized in that the material to be granulated has a low melting temperature and is selected from the group consisting of metalloids, metallic, and organic substances.

13. A process for drying and granulating a concentrated highly crystallizable solution, into particle sizes on the order of two millimeters in diameter or greater comprising the steps of heating said solution, and then atomizing and projecting said heated solution as a liquefied material coaxially with a sheathing stream of initially cold air, first upwardly through a drying region, wherein said atomized liquefied material is partially dried of solvent content and cooled through an exchange of caloric energy with said stream of air, thereby causing said air stream to become heated, and then upwardly through a bed of priming granules of core material, so as to cause said stream of air to maintain said granules suspended and to carry them upwardly within said air stream, thereby causing a continuous circulation of said granules and a progressive deposit on said granules of partially dried atomized liquefied material and a further drying by said air stream of said liquefied material on said granules, resulting in an additional transfer of heat to said air stream.

14. A process according to claim 13 comprising the additional step of directing at least a portion of the emergent stream of gas heated during the drying operation into a heat-exchanger for preheating said concentrated crystallizable solution to be atomized.

15. Apparatus for granulating a material in a liquefied phase into particle sizes on the order of two millimeters in diameter or greater comprising: an enclosure for confining a bed of priming granules of core material, said enclosure being in the form of a vertical container of substantial height having a downwardly converging lower portion of generally frusto-conical form terminating in a bottom opening; means for atomizing and projecting said material in a liquefied phase within a sheathing stream of gas phase into the bottom opening of said enclosure, said means directing said liquefied phase-gas phase stream first upwardly in said enclosure through an interaction region situated in said lower portion of said enclosure which is substantially free of subsequently produced granules, wherein said atomized liquefied material is partially treated in said region through caloric energy exchange with said gas, and then upwardly through said bed of granules; and means for regulating the flow rate of said stream of gas so as to cause said granules to be suspended therein substantially entirely above said interaction region solely by the kinetic and pressure heads of said liquefied phase-gas phase stream and to entrain and carry the lowermost granules upwardly within said stream inside said enclosure, thereby causing a continuous circulation of said granules above said interaction region and within said enclosure, with a progressive deposit on said granules of partially-treated liquefied material and a further treatment by said gaseous stream through the medium of caloric energy exchange to produce solidification of said material on said granules.

16. The apparatus of claim 15 further characterized in that said means for atomizing and projecting said material in a liquefied phase comprises, an injection nozzle located at the bottom of said lower portion of said enclosure, a conduit having an outlet end integral with said lower portion for directing said stream of gas into said enclosure in the form of a coaxial, concentric sheath around said liquefied material, and a junction between said outlet end and said lower portion of said enclosure which is arranged as a convergent-divergent device for promoting the atomizing and projection of said liquefied material.

17. The apparatus of claim 15 further including a pump means for projecting said liquefied material into said regulated gas stream under a pressure sufficient to atomize said material.

References Cited by the Examiner

UNITED STATES PATENTS

| | | | |
|---|---|---|---|
| 1,157,935 | 10/1915 | Gray | 154—4 X |
| 1,423,928 | 7/1922 | Field | 159—4 |
| 2,337,684 | 12/1943 | Sheineman | |
| 2,399,717 | 5/1946 | Arveson | 117—100 |
| 2,556,185 | 6/1951 | Joscelyne | 159—47 |
| 2,561,393 | 7/1951 | Marshall | 117—100 |
| 2,561,394 | 7/1951 | Marshall | 117—100 |
| 2,635,684 | 4/1953 | Joscelyne | 159—48 |
| 2,666,269 | 1/1954 | Parry | 34—10 |
| 2,797,981 | 7/1957 | Tooke | 23—1 |
| 2,968,683 | 1/1961 | Kossman | 34—10 X |
| 3,089,824 | 5/1963 | Wurster | 167—82 |
| 3,110,626 | 11/1963 | Larson et al. | 159—4 |
| 3,112,220 | 11/1963 | Heiser et al. | 117—100 |
| 3,117,027 | 1/1964 | Lindlof et al. | 117—100 |
| 3,118,658 | 1/1964 | Dennert | 263—61 |

FOREIGN PATENTS 1,187,976   9/1959   France.

NORMAN YUDKOFF, *Primary Examiner.*

GEORGE D. MITCHELL, *Examiner.*